United States Patent [19]

Ludden et al.

[11] Patent Number: 4,990,930
[45] Date of Patent: Feb. 5, 1991

[54] HIGH SPEED THERMAL PRINTING APPARATUS

[75] Inventors: Christopher A. Ludden, Fairport; David A. Johnson, Rochester, both of N.Y.

[73] Assignee: Eastman Kodak Company, Rochester, N.Y.

[21] Appl. No.: 533,226

[22] Filed: Jun. 4, 1990

[51] Int. Cl.$^5$ ............... G01D 9/03; G01D 15/10; H04N 1/21; B41J 2/325

[52] U.S. Cl. .................. 346/1.1; 346/76 PH; 346/134; 346/136; 346/138; 358/298; 400/120

[58] Field of Search ............ 346/76 PH, 134, 136, 346/138, 1.1; 400/120; 358/298

[56] References Cited

U.S. PATENT DOCUMENTS

| | | | |
|---|---|---|---|
| Re. 33,260 | 7/1990 | Stephenson | 346/76 PH |
| 4,710,781 | 12/1987 | Stephenson | 346/76 PH |
| 4,745,413 | 5/1988 | Brownstein et al. | 346/76 PH |
| 4,800,399 | 1/1989 | Long et al. | 346/76 PH |
| 4,804,975 | 2/1989 | Yip | 346/76 L |
| 4,804,977 | 2/1989 | Long | 346/76 L |
| 4,837,586 | 6/1989 | Brownstein | 346/76 PH |

*Primary Examiner*—Bruce A. Reynolds
*Assistant Examiner*—Huan Tran
*Attorney, Agent, or Firm*—Warren W. Kurz

[57] ABSTRACT

A continuous-tone thermal printer includes a transport mechanism for advancing a print medium past a thermal print head while continuous-tone image information is being printed, line-by-line, on the medium. To increase the rate at which thermal prints are produced, the printer includes asynchronous motor-control apparatus for selectively accelerating the movement of the print medium relative to the print head to quickly locate the print head at the start of a new image line immediately following the printing of that pixel(s) having the highest image density in the preceding image line. Preferably, such motor-control apparatus includes a digital signal processor which determines the maximum pixel density on each line. Upon printing such maximum pixel density, the digital signal processor causes a motor controller to temporarily increase the print medium velocity past the thermal print head to the start of the next image line.

12 Claims, 4 Drawing Sheets

HIGH SPEED THERMAL PRINTING APPARATUS

BACKGROUND OF THE INVENTION

The present invention relates to the field of thermal printing. More particularly, it relates to improvements in thermal printers of the type adapted to produce continuous tone images on a line-by-line basis.

Thermal printers of the above mentioned type are well-known. Typically, they comprise a cylindrical platen or drum for advancing a print medium, such as plain paper, past a thermal print head, and a dye-bearing donor web which is acted upon by the print head to transfer dye to the print medium. The print head usually comprises a linear array of closely spaced heating elements (resistors) which spans the transfer drum at the print zone. Each heating element can be selectively energized to raise the temperature of the heating element to the level required to cause dye to transfer to the receiver. Alternatively, the print head may comprise a linear array of electrically conductive elements which cooperate with a "resistor" donor web to thermally print image information. Such a print head is disclosed in U.S. Pat. No. 4,800,399. In either case, by electrically addressing all printing elements in the print head array simultaneously, an entire line of image information is printed at once. To produce continuous-tone images in which, for example, each picture element (pixel) of an image line exhibits any one of a multitude of different levels of gray, the duration of the current applied to each printing element is varied, either by varying the width of the current pulse or by varying the total number of current pulses within the time interval allotted to print an image line.

In continuous-tone thermal printers, it is common to continuously advance the print medium relative to the head during the line printing operation. Such movement enhances the print quality by blending the pixels of adjacent image lines together. Moreover, it prevents sticking of the heating elements to the donor web. Continuous movement of the print media is usually effected by a precision stepper motor which advances the print drum at a substantially constant rate which is sufficiently slow to allow each pixel in a line to receive the maximum gray level density (e.g. 256 levels of gray). As may be appreciated, the requirement to move the print medium at a rate no faster than that required to produce a maximum density image on each line has a limiting effect on the rate at which prints can be produced.

SUMMARY OF THE INVENTION

In light of the foregoing discussion, an object of this invention is to increase the print-making rate of high-resolution, continuous-tone thermal printers of the above-mentioned type without substantially sacrificing print quality.

In accordance with the present invention, the above object is achieved by the provision of a continuous-tone thermal printer which includes an asynchronous motor-control apparatus for controlling the movement of the print medium past the thermal print head. Such asynchronous motor control apparatus functions to advance the print media relative to the print head at a substantially constant velocity while the density of any pixel element in an image line is increasing in value, and to accelerate the print medium to the start of the next image line immediately after the maximum pixel density on the preceding line has been printed.

The invention and its various objects and advantages will become more apparent to those skilled in the art from the ensuing detailed description of a preferred embodiment, reference being made to the accompanying drawings.

DETAILED DESCRIPTION OF THE PREFERRED EMBODIMENTS

Figure 1:
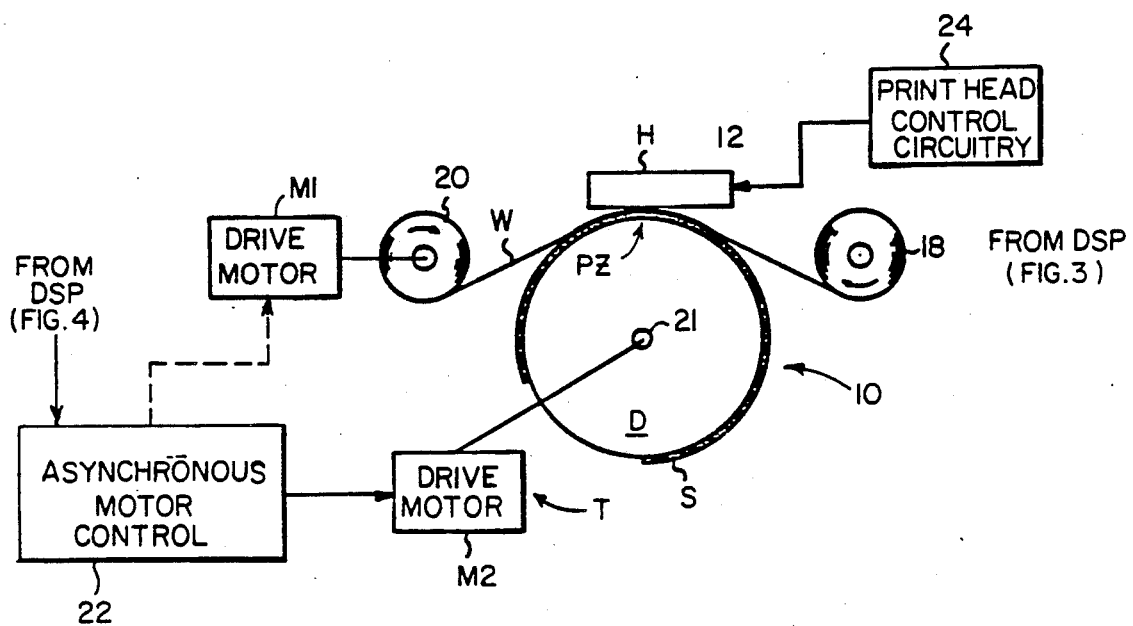
FIG. 1 is a schematic illustration of a thermal printer apparatus which can be employed to make high-speed continuous-tone images in accordance with the present invention.

Referring now to the drawings, FIG. 1 schematically illustrates a thermal printer 10 which is adapted to print color images, a line of pixels at a time, on an image-receiving sheet S. Such printer generally comprises a cylindrical print drum D which functions to support and transport the image-receiving sheet through a print zone PZ where it receives thermally printed information. Thermal printing is effected by advancing a dye-bearing donor through the print zone between the image-receiving sheet S and a thermal print head H. The print head may be movably mounted, e.g. pivotally mounted about pivot pin 12, for movement between a print position in which it presses against the print drum and the media therebetween, and a non printing position in which the print head is slightly spaced from the drum.

Figure 2:
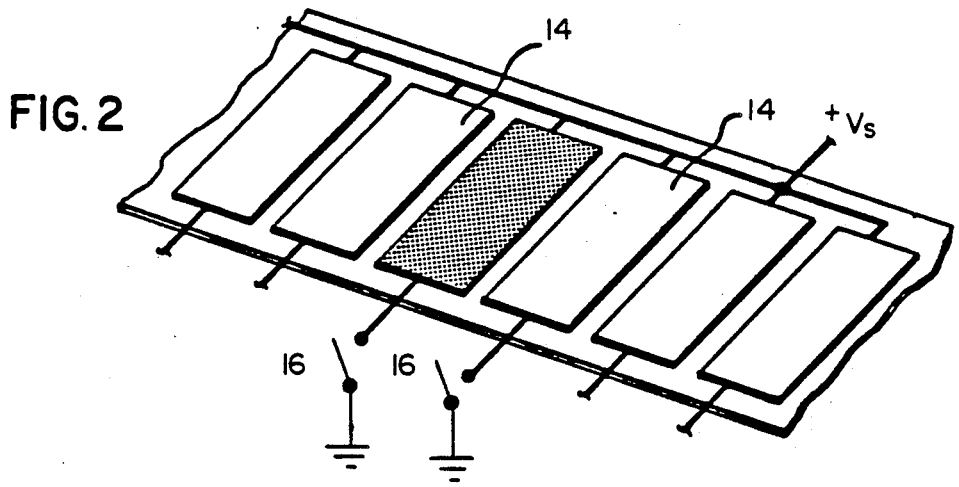
FIG. 2 is a perspective illustration of a portion of a thermal print head in the FIG. 1 apparatus.
Figure 3:
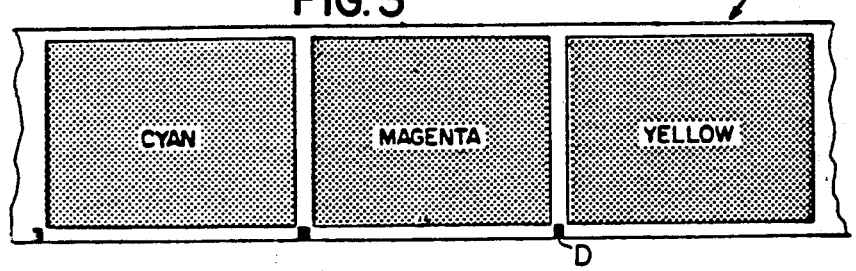
FIG. 3 is a top plan view of a dye-bearing donor web adapted for use in the thermal printer apparatus of FIG. 1.

Print head H spans the print drum and is of conventional design, comprising a linear array of closely spaced printing elements 14 (schematically shown in FIG. 2), each being independently addressable with image information, for example, via microprocesser-controlled switches 16. As indicated above, the print elements may either be in the form of tiny resistors which act upon a non-conductive donor web to transfer dye to the print media, or tiny conductive elements which act upon a resistive donor web, sometimes referred to as a "resistor ribbon" to effect dye transfer. As each printing element is addressed, it heats that portion of the donor web directly opposite, thereby causing dye to transfer from the donor web to the image-receiving sheet. In color thermal printers, the donor web usually comprises patches or frames of cyan, magenta and yellow dyes in a repeating series, a portion of such a web being shown in FIG. 3. In such color printers, the image-receiving sheet is cycled multiple times through the print zone to receive a full color image.

Dye-bearing donor web W is advanced through the print zone from a supply spool 18 to a take-up spool 20 by the force exerted by the print head on the print drum during printing. A slip clutch (not shown) acts on the donor web supply spool to prevent free-wheeling of the supply spool, while a drive motor M1 serves to rotate the take-up spool at a rate sufficient to wind up donor web as it is payed out of the print zone during printing.

As explained in more detail below, print drum D is rotatably driven by an asynchronous transport mechanism T comprising a precision drive (e.g. stepper) motor M2, operatively coupled to the drum shaft 21, and an asynchronous motor controller 22. The latter functions to continuously adjust the rotational velocity of the print drum in order to optimize the rate at which prints are produced. If desired, a more elaborate asynchronous motor controller may also control the donor web drive motor M1.

Figure 4:
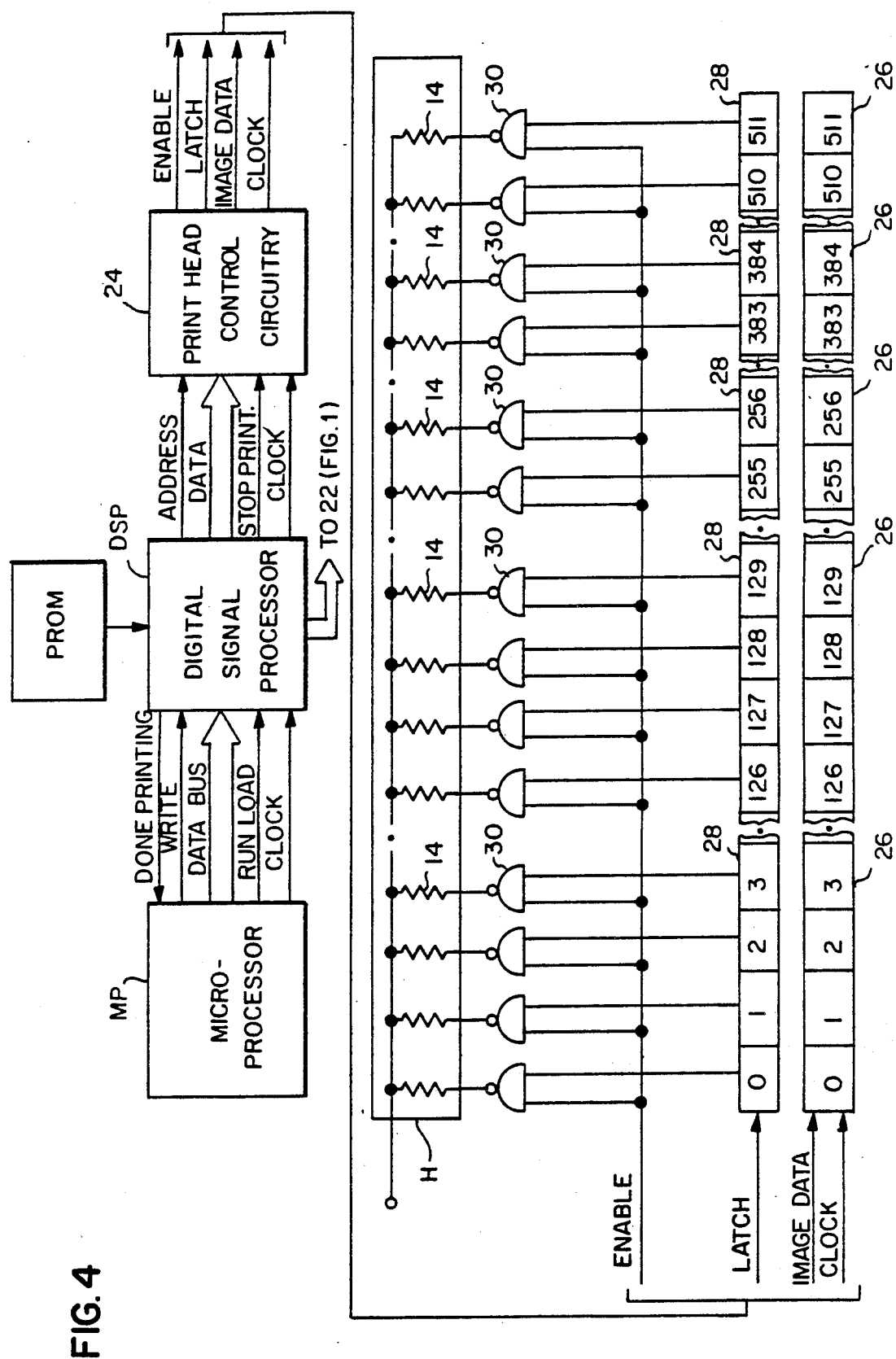
FIG. 4 is a electrical schematic of a control circuit for operating the thermal print head shown in FIG. 2.

Operation of print head H in timed relationship with the movement of the image-receiving sheet through the print zone is well-known and described, for example, in the commonly assigned U.S. Pat. No. 4,745,413. Briefly, the print head operation is controlled by a microprocessor MP, schematically illustrated in FIG. 4. During the printing of an image line, the density of each pixel is determined by an 8-bit digital word which, as shown in FIG. 4, is supplied over a databus to a digital signal processor DSP which provides suitable outputs to the print head control circuitry 24. In addition to providing the digital density information for each resistive element of the print head, the microprocessor provides a write signal, a clock signal, and other control signals.

Referring to FIG. 4, the print head control circuitry, operating under the control of the microprocessor, provides the necessary signals for selectively addressing each of the printing elements (shown as resistors) of the print head H. In the drawing, it is assumed that there are 512 printing elements in the print head. For each possible density level to be printed (e.g., 256 levels), the image data from the print control circuitry are serially loaded into the shift register 26 until all of its 512 stages either contain high (1) or a low (0) signal level or state, depending on the desired density of each pixel being printed. A latch signal provided by the control circuitry causes data in each state of the shift register to be entered in parallel into a corresponding stage of a latch 28. Each stage of latch 28 is connected to a corresponding NAND gate 30 which is addressed when an enable signal, provided by control circuit 24, is high. A circuit is completed through the printing elements 14 when both inputs to the NAND gates 30 are a high (1) state. As noted, one input to all of the NAND gates is provided simultaneously by a line enable signal produced by the print head control circuitry, and the other input is provided by latches 28 in accordance with whether or not a particular printing element is to be energized by the application of a current pulse. Thus, with each enable signal, all 512 of the printing elements of the print head are addressed simultaneously and may be selectively energized, depending on the state of their corresponding stages in latch 28. Assuming there are 256 possible dye density levels for each pixel, shift register 26 may have to be loaded with data 256 different times for each line of image data. Whenever any pixel in an image line is to be printed at maximum density, $D_{MAX}$, all printing elements of the print head will be addressed 256 times and, depending on the contents of the latch 28 during such addressing, each pixel will print a density level between $D_{MIN}$ and $D_{MAX}$.

As noted above, it is common in conventional printers to rotate the print drum at a constant speed sufficient to allow each pixel in the line to receive the maximum density image. It may be appreciated that, whenever the maximum pixel density on any given line is less than $D_{MAX}$, print time is wasted while the print drum is rotated, at fixed speed, to a position in which the image-receiving member is positioned to receive the succeeding image line. For example, in the above-described pulse code modulation (PCM) scheme if the maximum density in an image line is less than the maximum density obtainable (e.g. 150 levels out of 256 levels), then the time required to print 106 levels of gray is wasted on that particular image line while the print drum is rotated at a constant speed to the start of the next image line.

Now in accordance with the present invention, apparatus is provided for determining the maximum density pixel(s) to be printed on each line and, once that particular density level has been printed, for stopping the print head-addressing operation and accelerating the print drum and its image-receiving sheet to the start of the next image line. In carrying out this process, the digital words corresponding to a line of pixels are presorted by passing these words through the DSP (FIG. 4) to determine the pixel(s) which takes the longest time to print, i.e. has the highest density. The DSP makes this determination for each image line by comparing each new word (representing the pixel density for a printing element) with a previously stored word representing the highest density pixel that has passed through the DSP for that image line, and replacing the stored word with a new word when such new word represents a higher density. The DSP also controls the inputs to the asynchronous motor controller 22. As long as the density of any pixel in an image line is increasing in value, the DSP commands the motor controller to maintain a constant speed. As soon as the pixel(s) with the highest density has been printed, the DSP commands the motor controller to move the print drum and its image receiving sheet more rapidly to the start of the next line position. Of course, the print drum motor M2 must first accelerate and then decelerate back to the nominal printing speed. As soon as motor M2 has moved the print drum to the start of the next print position, using an accel-decel routine stored in a programmable read-only memory (PROM), the print head is commanded to begin printing the next image line.

Figure 5:
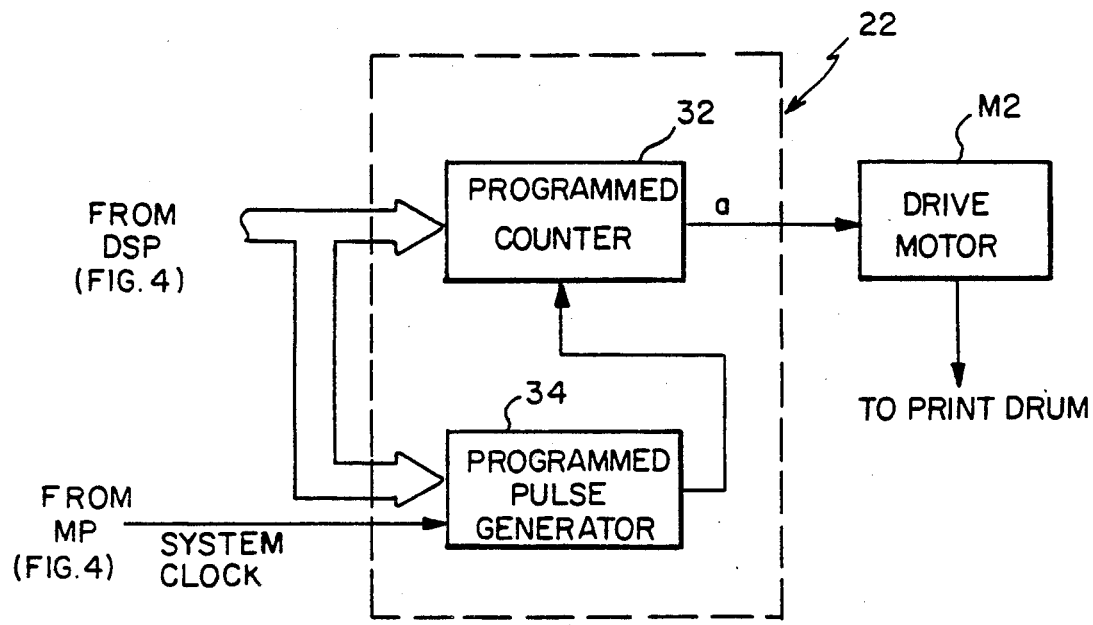
FIG. 5 is an electrical schematic of a preferred motor controller used in the FIG. 1 apparatus.

Preferred apparatus for performing the asynchronous motor control function is shown in FIG. 5. Such apparatus basically comprises the combination of a programmed counter 32 and a programmed pulse generator 34. In operation, the DSP loads a control word specifying the desired number of pulses into the input of the programmed counter, and loads a control word specifying the clocking frequency of the programmed pulse generator. Thus, the output of the programmed counter will be a desired number of pulses produced at the desired frequency. The programmable counter and pulse generator can be configured using standard TTL counters. The variable frequency of the programmable pulse generator is provided by dividing down the system clock provided by the microprocessor.

Figure 6:
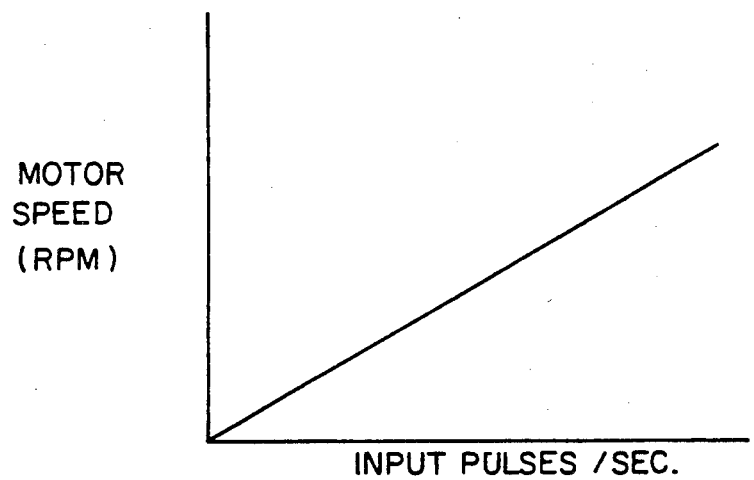
FIG. 6 is a graph illustrating motor speed versus pulses/sec of a conventional stepper motor.

As noted above, the output of the programmed counter is in the nature of a series of pulses which can vary in frequency. When applied to a conventional 2-phase, bipolar stepper motor, the higher the pulse frequency, the faster the motor speed in terms of revolutions per minute (RPM) of the motor shaft. A typical stepper motor response curve is shown in FIG. 6.

Figure 7A:
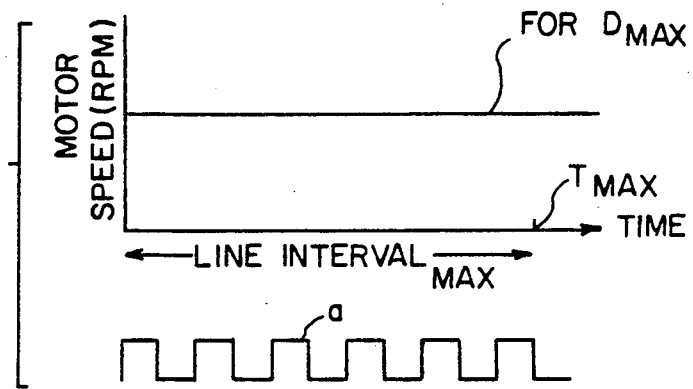
FIGS. 7A–7C are waveforms useful in better understanding a preferred embodiment of the invention.
Figure 7B:
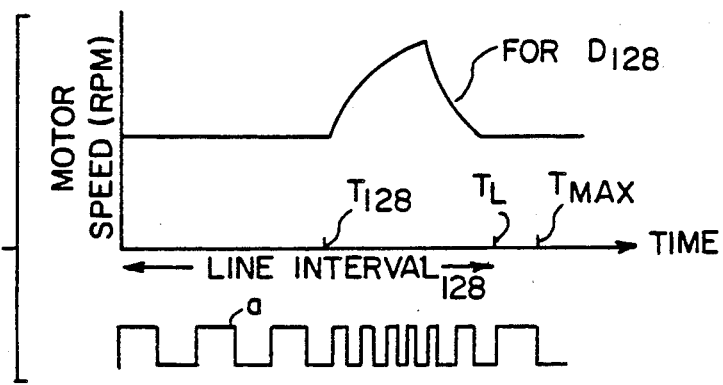
Figure 7C:
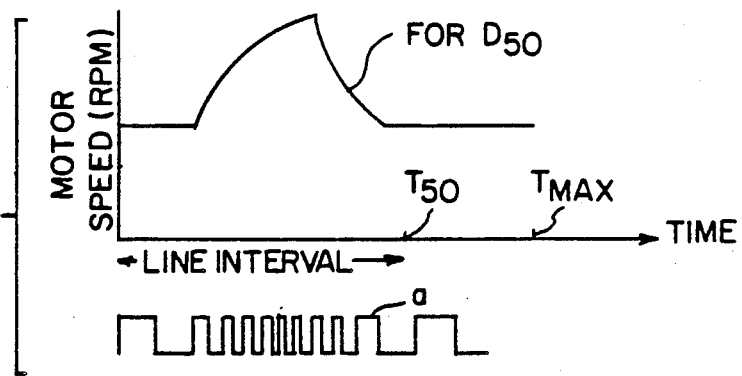

In the curves of FIGS. 7A–7C, stepper motor speed is plotted as a function of time for various pixel densities. In FIG. 7A, it is assumed that at least one pixel in an image line being printed is to be printed at maximum density. In this case, the print drum motor speed is maintained constant over the maximum line time interval $T_{MAX}$. As shown, the pulse frequency of the counter output a is maintained constant over the entire line interval $T_{MAX}$.

In FIG. 7B, however, it is assumed that the highest density pixel on an image line being printed has a gray level of only one-half $D_{MAX}$, i.e. $D_{128}$. In this case, the motor controller functions to accelerate the print drum immediately after a pixel density of $D_{128}$ has been printed, i.e., after a print time of $T_{MAX}/2$. As shown, the motor speed increases to a certain maximum and then decreases to the nominal printing speed. This increase in speed is achieved by loading new control words into the programmable counter and pulse generator, in accordance with a desired accelerate/decelerate routine, which determines the rate at which the print drum (and media) arrive at the start of the next image line. Note, by virtue of this accelerate/decelerate routine, the line time $T_L$ to print $D_{128}$ is somewhat shorter than $T_{MAX}$; in this manner a certain savings is realized in print time. Also shown in FIG. 7B is that the accelerate/decelerate routine is achieved by a suitable increase/decrease in the pulse frequency applied to the stepper motor by the motor controller. A similar motor velocity profile is shown in FIG. 7C where the maximum pixel density on a line being printed is $D_{50}$. As is apparent, a greater savings in print time is realized as the maximum pixel density being printed decreases in value.

As noted earlier, an asynchronous motor controller, similarly configured to that shown in FIG. 5, can be used to drive the donor web take-up spool, via drive motor M1, at a rate sufficient to accumulate donor web at the rate at which it is payed-out of the print zone (i.e. at the peripheral speed of the print drum). Alternatively, means can be provided for sensing slack produced in the donor web (between the print zone and the take-up spool) as produced by the accelerate/decelerate routine and for selectively varying the speed of the take-up spool to take-up such slack.

From the foregoing it will be appreciated that the thermal printer described above is significantly faster in producing prints than those prior-art printers having a fixed velocity print drum. The thermal printer disclosed herein is particularly advantageous in rapidly providing color prints of relatively low color saturation (i.e. low density).

The invention has been described in detail with particular reference to certain preferred embodiments thereof, but it will be understood that variations and modifications can be effected within the spirit and scope of the invention. For example, it is known, in some printers, to energize the printing elements during first and second halves of the time interval allotted to print an image line to more uniformly distribute heat during such interval. See, for example, the disclosure of the commonly assigned U.S. Pat. No. 4,745,413, such disclosure being incorporated herein by reference. In such a printer, the print head is loaded with two sets of data for each image line, and two sub-lines of image data are printed in the line image time interval. In such printers, the invention herein is useful to rapidly locate the print head at the start of the succeeding sub-line, as soon as the preceding sub-line has been printed. Thus, in the following claims, "sub-lines" can be substituted for "line" without departing from the intended scope of the claim.

We claim:

1. A continuous-tone thermal printer comprising:
   (a) a transport mechanism for advancing print medium along a predetermined path through a print zone;
   (b) means for contacting said print medium with a dye-bearing donor web at said print zone;
   (c) an elongated thermal print head extending transverse to said path at said print zone, said head contacting said donor web and comprising a plurality of printing elements, each of said printing elements being selectively energized for a variable length of time within a maximum time interval during which pixels of a line of image information are printed by causing dye to transfer from said donor web to said print medium, the density of each pixel being proportional to the length of time each printing element is selectively energized;
   (d) means for determining the maximum pixel density to be printed in each image line and for producing a control signal when such maximum pixel density has been printed in each image line at a time less than said maximum time interval; and
   (e) transport control means for controlling said transport mechanism to advance said print medium at a substantially constant velocity while the density of any pixel in an image line is increasing and, in response to said control signal, to increase the velocity of said print medium relative to said print head in order to locate said print medium at the start of the succeeding image line before said maximum time interval has expired.

2. The apparatus as defined by claim 1 wherein said transport control means comprises a digital signal processor operatively coupled to an information source and comprising means for determining, on an image line-by-image line basis which pixel(s) in each image line requires the longest time to print and to produce said control signal immediately after said pixel(s) has been printed.

3. The apparatus as defined by claim 2 wherein said transport mechanism comprises a rotatably mounted print drum for supporting and transporting said print medium and said donor web through said print zone, and a stePper motor for rotatably driving said print drum.

4. The apparatus as defined in claim 3 wherein said transport control means comprises a motor controller for periodically producing pulses at a constant frequency to said stepper motor while the density of any pixel in an image line is increasing, and for sequentially increasing and decreasing said frequency in response to said control signal, whereby the rotational velocity of said print drum is temporarily accelerated relative to said constant velocity and thereafter decelerated to said constant velocity.

5. The apparatus as defined in claim 1 wherein said printer further comprises:
   (a) a rotatably-mounted take-up spool for accumulating said dye-bearing donor web after contact with said print medium; and
   (b) motor means for rotatably driving said take-up spool; and
wherein said transport control means is operatively coupled to said motor means for controlling the rotational movement of said take-up spool in accordance with the rate of advance of said print medium.

6. A continuous-tone thermal printer comprising:
  (a) a rotatably-mounted print drum for advancing a print medium along a predetermined path through a print zone;
  (b) a drive motor for rotatably driving said drum;
  (c) means for contacting said print medium with a dye-bearing donor web at said print zone;
  (d) an elongated thermal print head extending transverse to said path at said print zone, said head contacting said donor web and comprising a plurality of printing elements, each of said printing elements being selectively energized for a variable length of time within a maximum time interval during which pixels of a line of image information are printed by causing dye to transfer from said donor web to said print medium, the density of each pixel being proportional to the length of time each printing element is selectively energized;
  (e) means for determining the maximum pixel density to be printed in each image line and for producing a control signal when such maximum pixel density has been printed in each image line at a time less than said maximum time interval; and
  (f) asynchronous motor control means for controlling said drive motor to advance said print drum at a substantially constant velocity while the denSity of any pixel in an image line is increasing and, in response to said control signal, to increase the velocity of said print drum relative to said print head in order to locate said print medium at the start of the succeeding image line before said maximum time interval has expired.

7. The apparatus as defined by claim 6 wherein said motor control means comprises a digital signal processor operatively coupled to an information source and comprising means for determining, on an image line-by-image line basis which pixel(s) in each image line requires the longest time to print and to produce said control signal immediately after said pixel(s) has been printed.

8. The apparatus as defined by claim 7 wherein said drive motor comprises a stepper motor responsive to a series of pulses to vary the rate of rotation of said print drum, and wherein said motor control means operates to temporarily increase the frequency of pulses applied to said stepper motor when the maximum pixel density on an image line has been printed.

9. The apparatus as defined in claim 8 wherein said motor control means comprises a means for periodically producing pulses at a constant frequency to said stepper motor while the density of any pixel in an image line is increasing, and for sequentially increasing and decreasing said frequency in response to said control signal, whereby the rotational velocity of said print drum is temporarily accelerated relative to said constant velocity, and thereafter decelerated back to said constant velocity.

10. In a continuous-tone thermal printer of the type comprising a transport mechanism for advancing a print medium past a thermal print head at a nominal velocity while such head is addressed with continuous-tone image information to print such information, on a line-by-line basis, on the medium, the improvement comprising an asynchronous motor-control means for selectively accelerating the movement of the print medium relative to the print head to quickly locate the print head at the start of a new image line immediately following the printing of that pixel(s) having the highest image density in the preceding image line.

11. The apparatus as defined by claim 10 wherein said motor-control means includes a digital signal processor which determines the highest pixel density on each line and, in the event said maximum pixel density is less than the maximum pixel density printable by said printer, for causing said transport mechanism to temporarily increase the print medium velocity past the thermal print head immediately after said highest pixel density has been printed on each line to locate the print medium at the start of the next image line.

12. A thermal printing process for producing continuous tone images, one line at a time, on a print medium each image line comprising a plurality of picture elements (pixels) which can incrementally vary in density up to a predetermined maximum density, said process comprising the steps of:
  (a) advancing a print medium along a predetermined path through a print zone;
  (b) contacting said print medium with a dye-bearing donor web at said print zone;
  (c) contacting said donor web with a print head extending transverse to said path at such print zone, said print head comprising a plurality of heating elements, each of said heating elements being selectively energizable for a variable length of time within a maximum time interval during which such pixels of a line of image information are printed by causing dye to transfer from said donor web to said print medium, the density of each pixel being proportional to the length of time each heating element is energized;
  (d) determining the maximum pixel density to be printed in each image line and producing a control signal when such maximum pixel density has been printed in each image line at a time less than said maximum time interval; and
  (e) advancing said print medium at a substantially constant velocity while the density of any pixel in an image line is increasing and, in response to said control signal, increasing the velocity of said print drum relative to said print head in order to locate said print medium at the start of the succeeding image line before said maximum time interval has expired.

* * * * *